United States Patent
Westendorf

(10) Patent No.: US 10,293,873 B1
(45) Date of Patent: May 21, 2019

(54) TRACTOR BRACKET STABILIZATION SYSTEMS AND METHODS

(71) Applicant: Westendorf Manufacturing Co., Inc., Onawa, IA (US)

(72) Inventor: Neal W. Westendorf, Onawa, IA (US)

(73) Assignee: Westendorf Manufacturing Co., Inc., Onawa, IA (US)

( * ) Notice: Subject to any disclaimer, the term of this patent is extended or adjusted under 35 U.S.C. 154(b) by 88 days.

(21) Appl. No.: 15/635,305

(22) Filed: Jun. 28, 2017

Related U.S. Application Data

(60) Provisional application No. 62/362,084, filed on Jul. 14, 2016.

(51) Int. Cl.
| | | |
|---|---|---|
| B62D 49/02 | (2006.01) | |
| E02F 3/36 | (2006.01) | |
| B62D 25/10 | (2006.01) | |

(52) U.S. Cl.
CPC ............ *B62D 49/02* (2013.01); *E02F 3/3695* (2013.01); *B62D 25/10* (2013.01)

(58) Field of Classification Search
CPC ........ B62D 49/02; E02F 3/627; E02F 3/3695; A01D 87/0069
USPC .......................................... 414/686; 172/273
See application file for complete search history.

(56) References Cited

U.S. PATENT DOCUMENTS

| | | | | |
|---|---|---|---|---|
| 2,551,322 A | * | 5/1951 | Ford ........................ | E02F 3/627 180/53.4 |
| 2,668,631 A | * | 2/1954 | Reese .................... | E02F 3/3408 414/698 |
| 2,708,526 A | * | 5/1955 | Ulrich ..................... | E02F 3/627 414/717 |
| 2,738,083 A | * | 3/1956 | Cadwell ............. | A01D 87/0069 172/273 |
| 2,820,555 A | * | 1/1958 | Lessmann ............. | E02F 3/3408 414/707 |
| 2,970,707 A | * | 2/1961 | Wagner .................... | E02F 3/627 414/715 |
| 3,863,786 A | * | 2/1975 | Frank ..................... | E02F 3/6273 414/607 |
| 4,318,662 A | * | 3/1982 | Erickson ................. | E02F 3/384 172/272 |
| 4,383,793 A | * | 5/1983 | Weir ...................... | E02F 3/6273 37/403 |
| 4,538,955 A | * | 9/1985 | Langenfeld ............... | E02F 3/34 414/686 |

(Continued)

FOREIGN PATENT DOCUMENTS

| | | | | |
|---|---|---|---|---|
| DE | 1118696 B | * | 11/1961 | .............. E02F 3/627 |
| DE | 1271027 B | * | 6/1968 | .............. E02F 3/627 |

OTHER PUBLICATIONS

Machine Language Translation of DE 1118696-B, obtained from esp@cenet on Dec. 5, 2018.*

*Primary Examiner* — Ruth Ilan
(74) *Attorney, Agent, or Firm* — Joseph M. Butscher; The Small Patent Law Group, LLC

(57) ABSTRACT

A bracket stabilization system is configured to be secured to a tractor. The bracket stabilization system includes a cross bar linking bracket that extends between opposed first and second lateral brackets extending from opposite sides of the tractor. The cross bar linking bracket securely couples the opposed first and second lateral brackets together.

9 Claims, 4 Drawing Sheets

(56) References Cited

U.S. PATENT DOCUMENTS

| | | | | | |
|---|---|---|---|---|---|
| 4,755,101 | A | * | 7/1988 | Hamada | E02F 3/6273 172/274 |
| 4,797,051 | A | * | 1/1989 | Langenfeld | E02F 3/6273 414/686 |
| 5,088,213 | A | * | 2/1992 | Raimondo | E02F 3/96 37/379 |
| 6,056,502 | A | * | 5/2000 | Takemura | B62D 21/09 172/275 |
| 6,796,762 | B2 | * | 9/2004 | Vicars, III | E02F 3/3405 414/685 |
| 6,866,466 | B2 | * | 3/2005 | Roan | E02F 3/3405 414/680 |

\* cited by examiner

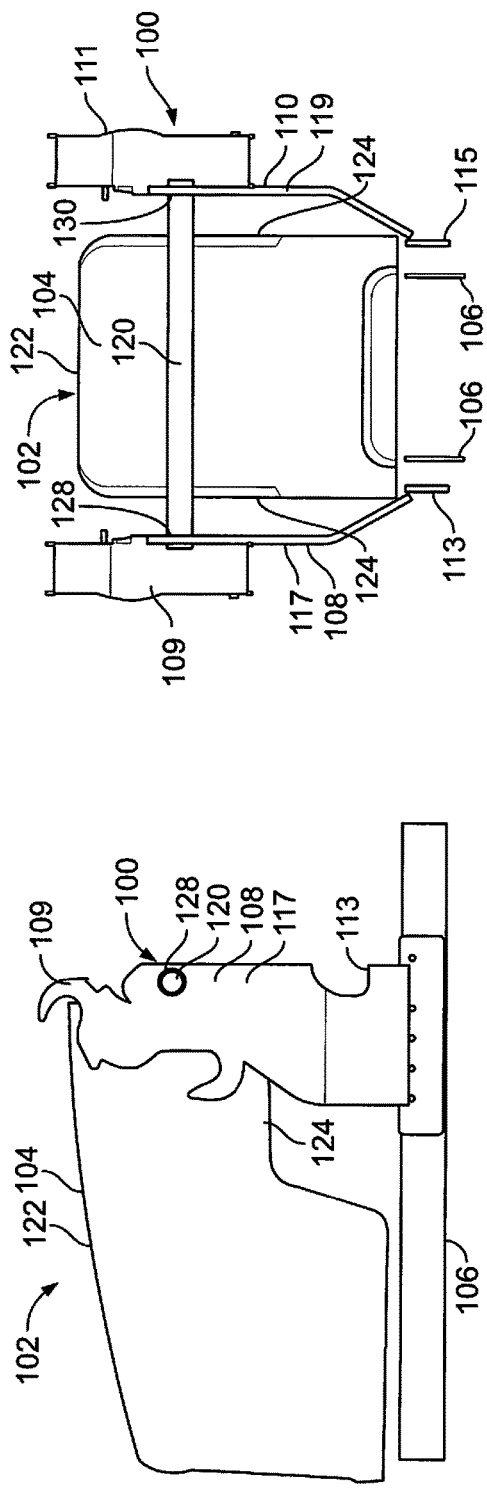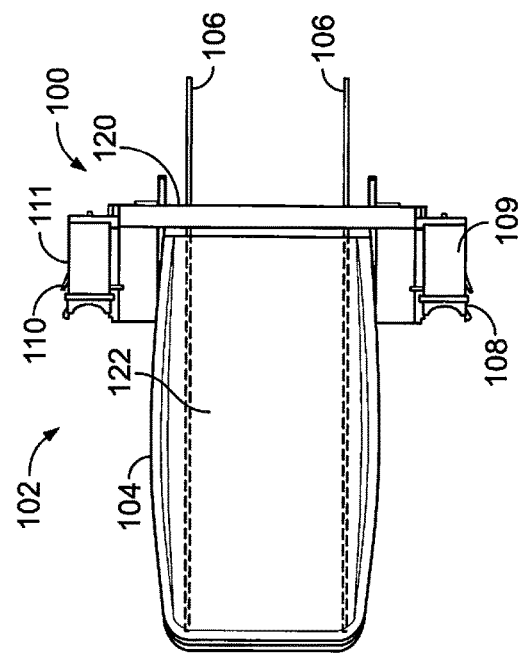

TRACTOR BRACKET STABILIZATION SYSTEMS AND METHODS

RELATED APPLICATIONS

This application relates to and claims priority benefits from U.S. Provisional Patent Application No. 62/362,084 entitled "Tractor Bracket Stabilization Systems and Methods," filed Jul. 14, 2016, which is hereby incorporated by reference in its entirety.

FIELD OF THE DISCLOSURE

Embodiments of the present disclosure generally relate to tractor bracket stabilization systems and methods, and, more particularly, to bracket stabilization systems that securely couple opposed brackets of a tractor together.

BACKGROUND OF THE DISCLOSURE

Work or utility vehicles, such as tractors, are often adapted to be used with various types of attachments. For example, a loader may be attached to the front of a tractor through arms and hydraulic controls that allow the loader to be raised and lowered, and also rolled forward and backward. Many different attachment or implements may be attached to the front of the work vehicles, thereby allowing an operator to accomplish various tasks with a single work vehicle.

Conventional front-end loaders include a pair of lifting arms or boom assemblies that include towers or rearward ends that pivotally attach to a tractor, and lifting arms or forward ends that pivotally attach to an implement. Generally, the arms of the loader and the attached implement may be controlled by a hydraulic system. Hydraulic cylinders may be configured to operate front-end loaders and their attached implements. Hydraulic lines may extend along an exterior (or routed along the interior) of the front-end loaders for powering the hydraulic cylinders.

Each lifting arm of a loader is typically connected to a bracket that is coupled to a portion of a tractor, for example. Each bracket may outwardly extend from a lateral portion of the tractor.

During operation of the tractor and front loader, a bucket of the front loader may be urged into the ground, objects, and the like. The forces exerted into the bucket are typically translated into the arms of the front loader, which are then translated into the tractor. As an example, various forces generate corresponding twisting forces in the arms of the front loader, which are then translated into the brackets. The exerted forces may cause stresses and strains that are translated into the tractor, and may cause damage thereto.

SUMMARY OF THE DISCLOSURE

A need exists for stabilizing brackets of a tractor. Further, a need exists for eliminating, minimizing, or otherwise mitigating potential damage caused to brackets of a tractor, or the tractor itself, from forces generated during operation of a front loader, for example.

With those needs in mind, certain embodiments of the present disclosure provide a bracket stabilization system that is configured to be secured to a tractor. The bracket stabilization system includes a cross bar linking bracket that extends between opposed first and second lateral brackets extending from opposite sides of the tractor. The cross bar linking bracket securely couples the opposed first and second lateral brackets together.

In at least one embodiment, the cross bar linking bracket is positioned below a top surface of a hood of the tractor and above a frame of the tractor. Further, the cross bar linking bracket may be positioned behind the hood. Optionally, the cross bar linking bracket may extend through lateral wall portions of the hood.

In at least one embodiment, the cross bar linking bracket connects to the opposed first and second lateral brackets proximate to respective first and second couplings that are configured to couple to respective arms of a utility component. The cross bar linking bracket may be above lower ends of the first and second lateral brackets that couple to a frame of the tractor.

The cross bar linking bracket may include a linear tube. In at least one embodiment, the cross bar linking bracket includes a main body having opposite first and second ends. The first and second ends directly couple to the first and second lateral brackets, respectively. For example, the first and second ends may securely couple to first and second reciprocal portions of the first and second lateral brackets, respectively.

Certain embodiments of the present disclosure provide a bracket stabilization system method for a tractor. The bracket stabilization method includes connecting a cross bar linking bracket between opposed first and second lateral brackets extending from opposite sides of the tractor, and securely coupling the opposed first and second lateral brackets together through the connecting.

The connecting may include positioning the cross bar linking bracket below a top surface of a hood of the tractor and above a frame of the tractor. The positioning may include positioning the cross bar linking bracket behind the hood. Optionally, the positioning may include extending the cross bar linking bracket through lateral wall portions of the hood.

In at least one embodiment, the connecting includes connecting the cross bar linking bracket to the opposed first and second lateral brackets proximate to respective first and second couplings that are configured to couple to respective arms of a utility component. Further, the connecting may include positioning the cross bar linking bracket above lower ends of the first and second lateral brackets that couple to a frame of the tractor.

In at least one embodiment, the connecting includes directly coupling first and second ends of a main body of the cross bar linking bracket to the first and second lateral brackets, respectively. The directly coupling may include securely coupling the first and second ends to first and second reciprocal portions of the first and second lateral brackets, respectively.

Certain embodiments of the present disclosure provide a tractor including a frame, a hood that is configured to move relative to the frame between open and closed positions, a first lateral bracket having a first lower end secured to the frame, a first main body extending upwardly and outwardly from the frame offset from a first side of the hood, and a first coupling that is configured to couple to a first arm of a utility component, and a second lateral bracket having a second lower end secured to the frame, a second main body extending upwardly and outwardly from the frame offset from a second side of the hood, and a second coupling that is configured to couple to a second arm of the utility component.

The tractor also includes a bracket stabilization system stabilization system that includes a cross bar linking bracket that extends between the first and second lateral brackets. The cross bar linking bracket securely couples the first and second lateral brackets together.

BRIEF DESCRIPTION OF THE DRAWINGS

FIG. 3 illustrates a lateral view of a bracket stabilization system secured to a tractor, according to an embodiment of the present disclosure.

FIG. 4 illustrates a rear view of a bracket stabilization system secured to a tractor, according to an embodiment of the present disclosure.

FIG. 5 illustrates a top view of a bracket stabilization system secured to a tractor, according to an embodiment of the present disclosure.

DETAILED DESCRIPTION OF THE DISCLOSURE

The foregoing summary, as well as the following detailed description of certain embodiments will be better understood when read in conjunction with the appended drawings. As used herein, an element or step recited in the singular and proceeded with the word "a" or "an" should be understood as not excluding plural of the elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Figure 1:
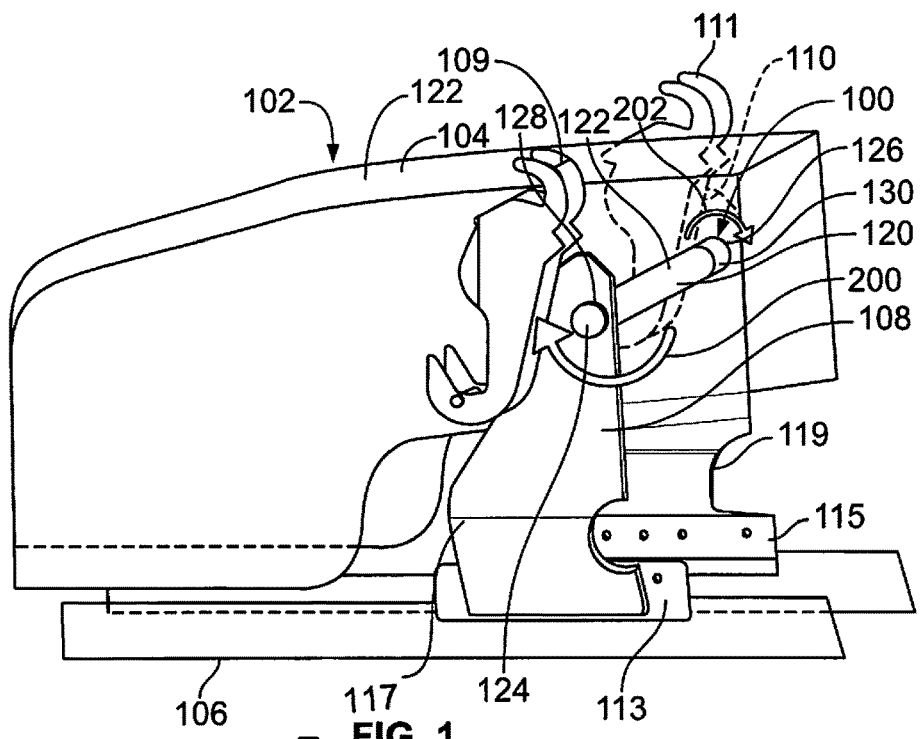
FIG. 1 illustrates a perspective lateral view of a bracket stabilization system secured to a tractor, according to an embodiment of the present disclosure.

FIG. 1 illustrates a perspective lateral view of a bracket stabilization system 100 secured to a tractor 102, according to an embodiment of the present disclosure. The tractor 102 includes a hood 104 (which may be moveably secured over an engine, for example) coupled to a frame 106. For the sake of clarity, the bracket stabilization system 100 is shown through the hood 104. Opposed lateral brackets 108 and 110 (including couplings 109 and 111, respectively) are secured to the tractor 102.

In at least one embodiment, lower ends 113 and 115 of the lateral brackets 108 and 110, respectively, are secured to respective lateral portions of the frame 106. Main bodies 117 and 119 of the brackets 108 and 110, respectively, extend upwardly from the frame 106 offset (that is, spaced apart) opposite sides of the hood 104. The couplings 109 and 111 are configured to securely couple to portions of a utility component, such as arms of a front loader.

Examples of tractors and brackets are further described in U.S. Pat. No. 9,555,842, entitled "Adapter Bracket Assembly Configured To Adapt A Utility Vehicle For Use With A Different Utility Component," which is hereby incorporated by reference in its entirety.

The bracket stabilization system 100 includes a cross bar linking bracket 120 that securely couples the opposed brackets 108 and 110 together. The cross bar linking bracket 120 extends between and connects to both the brackets 108 and 110. The cross bar linking bracket 120 includes a main body 122 having opposite ends 124 and 126. The end 124 is secured into a reciprocal portion 128 (such as a hole, opening, channel, bearing, or the like) of the bracket 108. Optionally, the reciprocal portion 128 may be a securing interface at which the end 124 securely connects to the bracket 108, such as through one or more fasteners, bonding, welding, and/or the like. The end 126 is secured into a reciprocal portion 130 (such as a hole, opening, channel, bearing, or the like) of the bracket 110. Optionally, the reciprocal portion 130 may be a securing interface at which the end 126 securely connects to the bracket 110, such as through one or more fasteners, bonding, welding, and/or the like. By directly connecting to both the lateral brackets 108 and 110, the cross bar linking bracket 120 securely links and couples the brackets 108 and 110 together.

The cross bar linking bracket 120 is positioned below a top surface 122 of the hood 104, and above the frame 106. In at least one embodiment, the cross bar linking bracket 120 is positioned behind a portion of the hood 104. In at least one other embodiment, the cross bar bracket 120 extends through lateral wall portions of the hood 104. As shown in FIG. 1, the cross bar linking bracket 120 extends through panels portions of the hood 104. Optionally, the cross bar linking bracket 120 may be offset behind rear portions of the hood 104.

The cross bar linking bracket 120 may be a cylindrical tube, rod, or the like. In at least one embodiment, the cross bar linking bracket 120 is or otherwise includes a hollow or solid tube, for example. The cross bar linking bracket 120 may be a single linear tube. It has been found that a cylindrical tube shape resists twisting or torqueing forces 200 and 202 exerted into the brackets 108 and 110 from various, if not all, directions.

Alternatively, the cross bar linking bracket 120 may have various other shapes and sizes. For example, the cross bar linking bracket 120 may include a square axial cross-section. Also, the cross bar linking bracket 120 may be other than linear. For example, the cross bar linking bracket 120 may have an arcuate shape, one or more bends, and/or the like. Further, the cross bar linking bracket 120 may be assembled from a plurality of separate and distinct segments.

Figure 2:
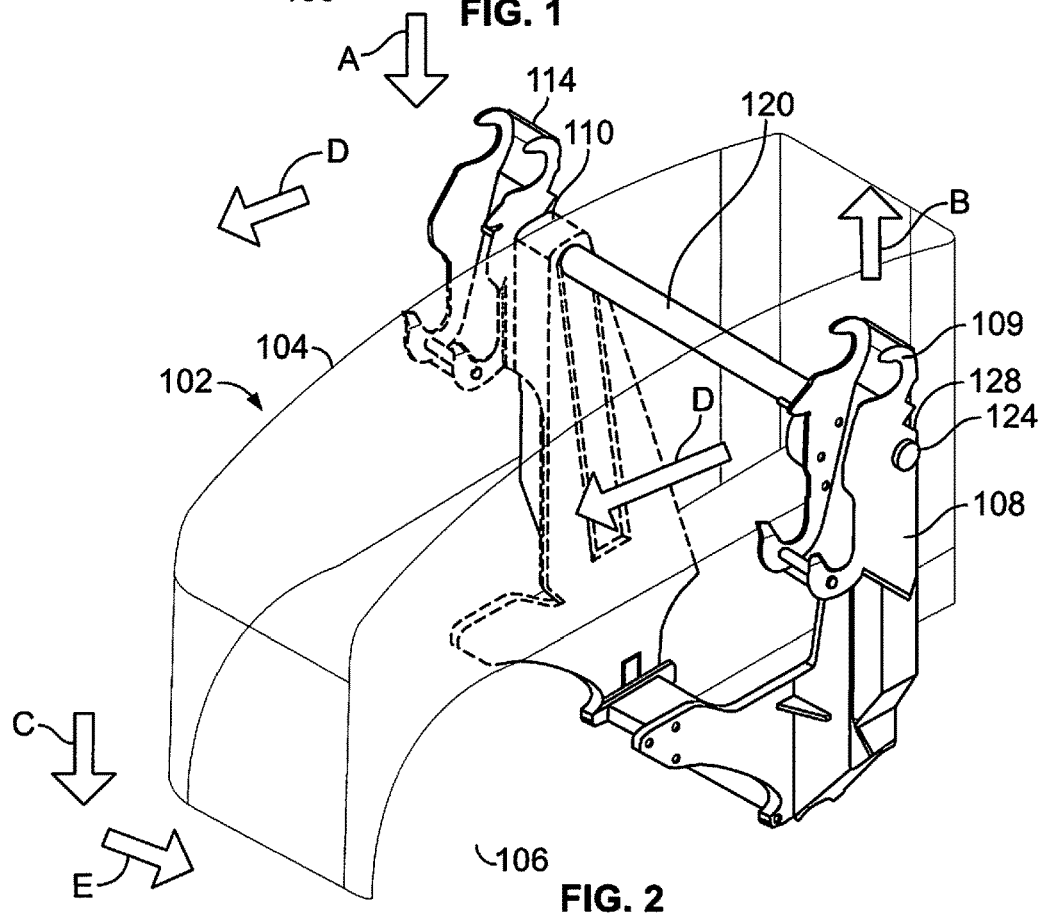
FIG. 2 illustrates a perspective top view of a bracket stabilization system Secured to a tractor, according to an embodiment of the present disclosure.

FIG. 2 illustrates a perspective top view of the bracket stabilization system 100 secured to the tractor 102. The cross bar linking bracket 120 resists forces A, B, and C (and forces opposite therefrom) that are urged into the brackets 108 and 110 during operation of a utility component (such as a front loader). For example, as the utility component moves in forward and reverse directions D and E, the forces A, B, C, and/or opposite forces therefrom, are exerted into the brackets 108 and 110.

The cross bar linking bracket 120 securely couples (for example, ties) the brackets 108 and 110 together, and absorbs the forces A, B, and C, so that the brackets 108 and 110 remain securely coupled together in a stable position. Further, the cross bar linking bracket 120 minimizes or otherwise reduces translation of the forces A, B, and C into the hood 104 and the frame 106. In this manner, the cross bar linking bracket 120 eliminates, minimizes, or otherwise mitigates any potential damage to the brackets 108, 110, the hood 104, and the frame 106 from various forces exerted into the brackets 108 and 110 during operation of a utility component, such as a front loader.

FIGS. 3, 4, and 5 illustrate lateral, rear, and top views, respectively, of the bracket stabilization system 100 secured to the tractor 102. As shown in FIGS. 3-5, the cross bar linking bracket 120 may be positioned below the top surface 122 of the hood 104, and behind lateral walls 124 of the hood 104. Accordingly, separate passages need not be formed through the hood 104 to allow passage of the cross bar linking bracket 120. Further, the cross bar linking bracket 120 is secured above the frame 106. That is, the cross bar linking bracket 120 does not directly connect to the frame 106. As such, the cross bar linking bracket 120 need not be directly connected to either the hood 104 or the frame 106. In this manner, the structural integrity of the hood 104 and the frame 106 is maintained. Optionally, the cross bar linking bracket 120 may extend through channels formed through the lateral walls 124 of the hood 104.

As shown, the lower ends 113 and 115 of the brackets 108 and 110 are securely mounted to the frame 106, while the cross bar linking bracket 120 connects to the main bodies 117 and 119 of the brackets 108 and 110 proximate to the couplings 109 and 111. As such, the cross bar linking bracket 120 ties the brackets 108 and 110 together at a height substantially above the lower ends 113 and 115. Therefore, the brackets 108 and 110 are securely stabilized at four separate points, namely at the two lower ends 113 and 115 and the frame 106, and at the reciprocal portions 128 and 130. The distances between the separated points of stabilization provide a secure and stable connection between the brackets 108, 110 and the frame 106.

The cross bar linking bracket 120 ensures that the brackets 108 and 110 remain securely coupled together In at least one embodiment, the cross bar linking bracket 120 maintains the brackets 108 and 110 together in a fixed orientation. The cross bar linking bracket 120 braces and absorbs twisting forces exerted into the brackets 108 and 110.

Figure 6:
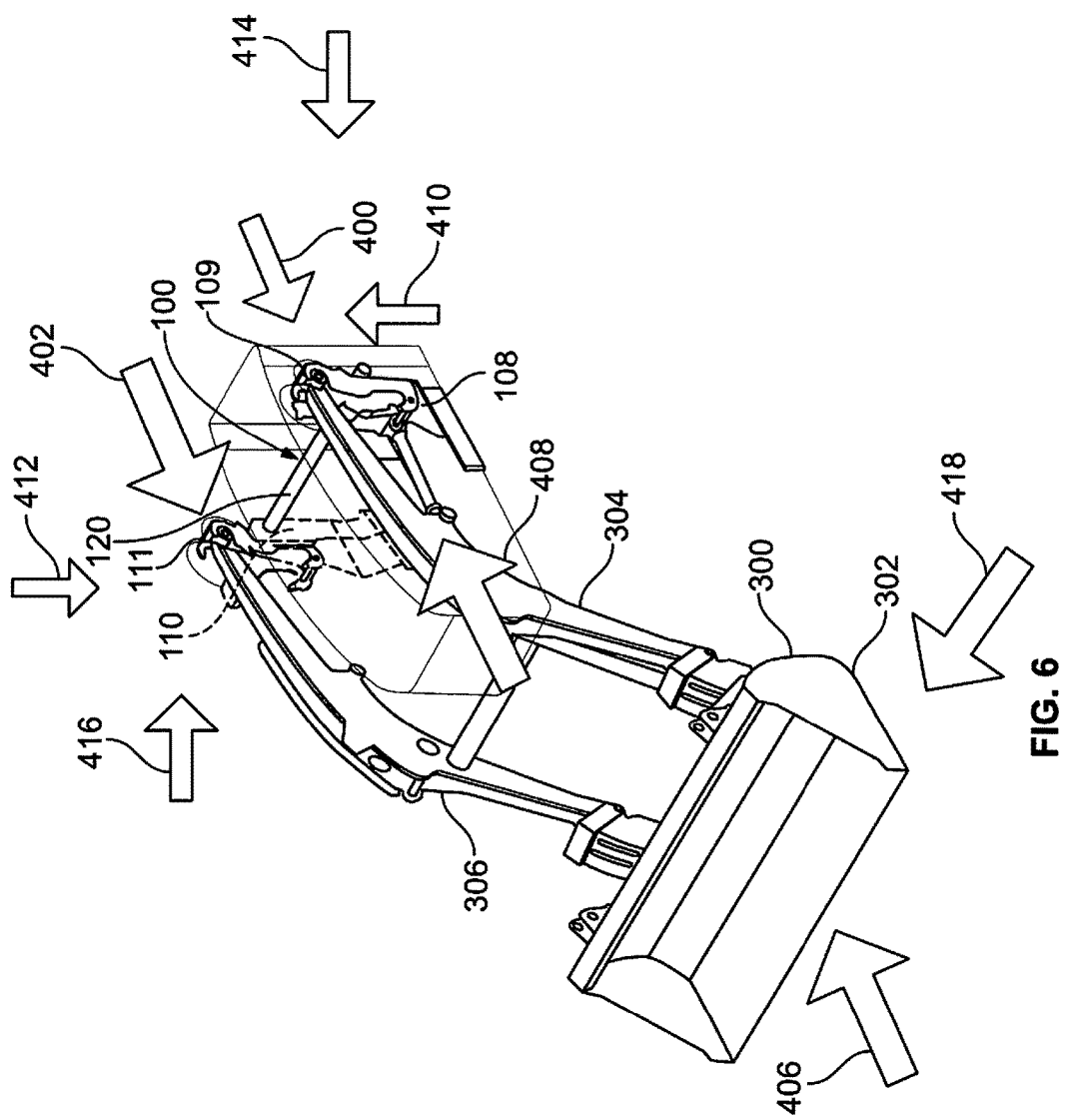
FIG. 6 illustrates a perspective top view of a front loader having a bucket coupled to brackets, according to an embodiment of the present disclosure.

FIG. 6 illustrates a front loader 300 having a bucket 302 coupled to the brackets 108 and 110 through arms 304 and 306, according to an embodiment of the present disclosure. Forces 400, 402, 406, 408, 410, 412, 414, 416, and 418 (forces opposite therefrom, and/or additional forces not shown) exerted into the front loader 300 are absorbed by the cross bar linking bracket 120, which ensures that the brackets 108 and 110 remain securely coupled together. The cross bar linking bracket 120 absorbs the forces exerted into the brackets 108 and 110, which prevents, minimizes, or otherwise reduces the possibility of the brackets 108 and 110 from moving inwardly or away from one another, and/or from the forces translating into the hood 104 and/or the frame 106.

Figure 7:
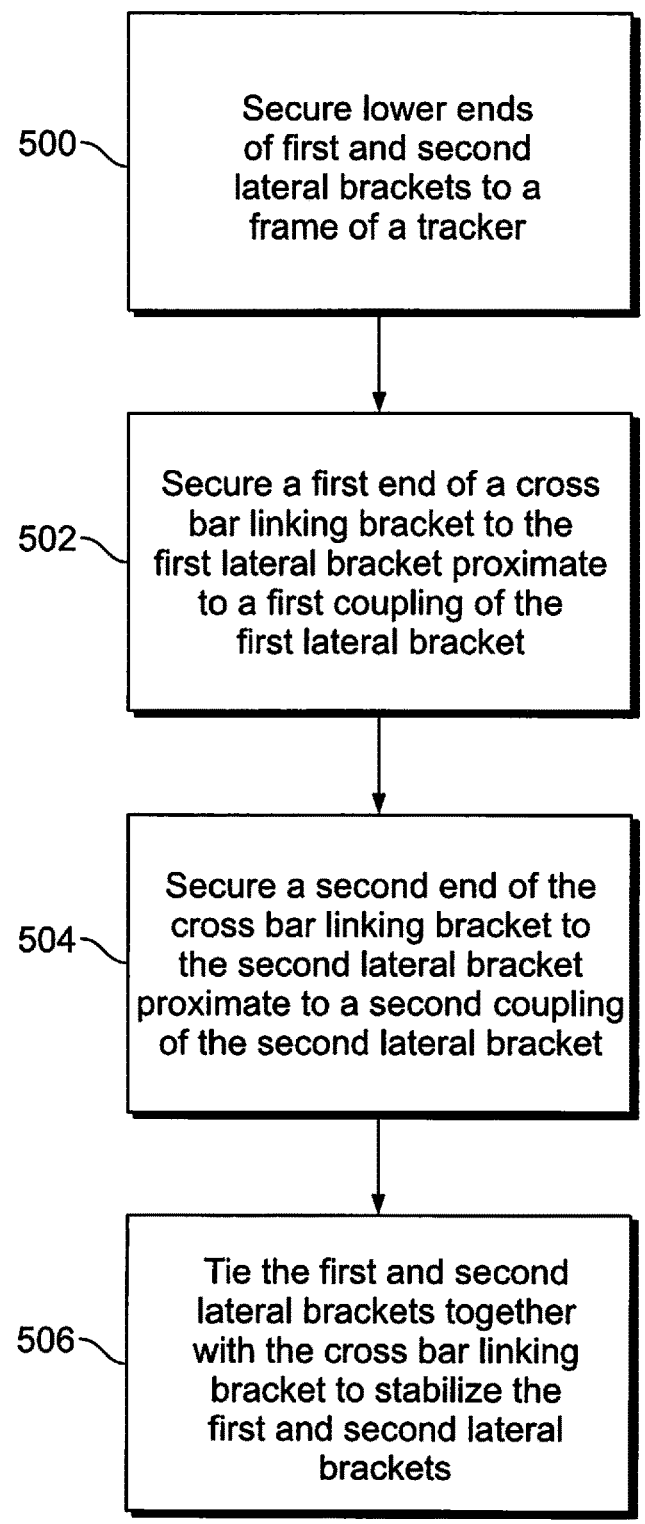
FIG. 7 illustrates a flow chart of a method of stabilizing brackets of a tractor, according to an embodiment of the present disclosure.

FIG. 7 illustrates a flow chart of a method of stabilizing brackets of a tractor, according to an embodiment of the present disclosure. The method begins at 500, at which lower ends of first and second lateral brackets are secured to a frame of a tractor. At 502, a first end of a cross bar linking bracket is secured to the first lateral bracket proximate to a first coupling of the first lateral bracket. At 504, a second end of the cross bar linking bracket is secured to the second lateral bracket proximate to a second coupling of the second lateral bracket. At 506, the first and second lateral brackets are tied together with the cross bar linking bracket to stabilize the first and second lateral brackets.

As described herein, embodiments of the present disclosure provide systems and methods for stabilizing brackets of a tractor. Further, embodiments of the present disclosure provide systems and methods that eliminate, minimize, or otherwise mitigate potential damage caused to brackets of a tractor, or the tractor itself, from forces generated during operation of a utility component, such as a front loader.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A bracket stabilization system secured to a tractor, the bracket stabilization system comprising:
   a cross bar linking bracket that extends between opposed first and second lateral brackets extending from opposite sides of the tractor, wherein the cross bar linking bracket securely couples the opposed first and second lateral brackets together,
   wherein the cross bar linking bracket comprises a linear tube including a main body having opposite first and second ends that directly couple to the first and second lateral brackets, respectively, wherein the cross bar linking bracket is positioned below a top surface of a hood of the tractor and above a frame of the tractor, wherein the cross bar linking bracket connects to the opposed first and second lateral brackets proximate to respective first and second couplings that couple to respective arms of a utility component, wherein the cross bar linking bracket is above lower ends of the first and second lateral brackets that couple to the frame of the tractor.

2. The bracket stabilization system of claim 1, wherein the cross bar linking bracket is positioned behind the hood.

3. The bracket stabilization system of claim 1, wherein the cross bar linking bracket extends through lateral wall portions of the hood.

4. The bracket stabilization system of claim 1, wherein the first and second ends securely couple to first and second reciprocal portions of the first and second lateral brackets, respectively.

5. A bracket stabilization system method for a tractor, the bracket stabilization method comprising:
connecting a cross bar linking bracket between opposed first and second lateral brackets extending from opposite sides of the tractor, wherein the cross bar linking bracket comprises a linear tube including a main body having first and second ends, wherein the connecting comprises:
positioning the cross bar linking bracket below a top surface of a hood of the tractor and above a frame of the tractor;
connecting the cross bar linking bracket to the opposed first and second lateral brackets proximate to respective first and second couplings that are configured to couple to respective arms of a utility component;
positioning the cross bar linking bracket above lower ends of the first and second lateral brackets that couple to a frame of the tractor; and
directly coupling first and second ends of a main body of the cross bar linking bracket to the first and second lateral brackets, respectively; and
securely coupling the opposed first and second lateral brackets together through the connecting the cross bar linking bracket between the opposed first and second lateral brackets extending from the opposite side of the tractor.

6. The bracket stabilization method of claim 5, wherein the positioning comprises positioning the cross bar linking bracket behind the hood.

7. The bracket stabilization method of claim 5, wherein the positioning comprises extending the cross bar linking bracket through lateral wall portions of the hood.

8. The bracket stabilization method of claim 5, wherein the directly coupling comprises securely coupling the first and second ends to first and second reciprocal portions of the first and second lateral brackets, respectively.

9. A tractor comprising:
a frame;
a hood that is configured to move relative to the frame between open and closed positions;
a first lateral bracket having a first lower end secured to the frame, a first main body extending upwardly and outwardly from the frame offset from a first side of the hood, and a first coupling that is configured to couple to a first arm of a utility component;
a second lateral bracket having a second lower end secured to the frame, a second main body extending upwardly and outwardly from the frame offset from a second side of the hood, and a second coupling that is configured to couple to a second arm of the utility component; and
a bracket stabilization system stabilization system comprising:
a cross bar linking bracket that extends between the first and second lateral brackets, wherein the cross bar linking bracket securely couples the first and second lateral brackets together, wherein the cross bar linking bracket comprises a linear tube including a main body having opposite first and second ends, wherein the first and second ends directly couple to first and second portions of the first and second lateral brackets, respectively,
wherein the cross bar linking bracket is positioned below a top surface of the hood and above a frame of the tractor, wherein the cross bar linking bracket connects to the first and second lateral brackets proximate to the first and second couplings, and wherein the cross bar linking bracket is above the first and second lower ends of the first and second lateral brackets, respectively.

\* \* \* \* \*